(12) United States Patent
Katayama et al.

(10) Patent No.: US 7,646,516 B2
(45) Date of Patent: Jan. 12, 2010

(54) IMAGE FORMING APPARATUS AND READING METHOD OF TWO-SIDED DOCUMENT

(75) Inventors: Yoshiki Katayama, Hachioji (JP); Atsushi Takahashi, Akishima (JP); Norio Joichi, Kokubunji (JP); Youbao Peng, Hino (JP); Yoshihito Sasamoto, Hachioji (JP); Takashi Nara, Niiza (JP)

(73) Assignee: Konica Minolta Business Technologies, Inc. (JP)

( * ) Notice: Subject to any disclaimer, the term of this patent is extended or adjusted under 35 U.S.C. 154(b) by 660 days.

(21) Appl. No.: 11/403,066

(22) Filed: Apr. 11, 2006

(65) Prior Publication Data

US 2006/0291012 A1    Dec. 28, 2006

(30) Foreign Application Priority Data

Jun. 27, 2005    (JP)    ............................. 2005-186210

(51) Int. Cl.
*H04N 1/04* (2006.01)
*G03G 15/23* (2006.01)

(52) U.S. Cl. ................. 358/498; 358/496; 358/497; 358/408

(58) Field of Classification Search ........... 358/408, 358/496, 498, 497, 401, 501, 474, 505; 399/374, 399/367, 364; 355/23, 24; 271/3.08, 3.05; 382/318
See application file for complete search history.

(56) References Cited

U.S. PATENT DOCUMENTS

| 5,055,880 | A | * | 10/1991 | Fujiwara | 399/203 |
| 5,091,755 | A | * | 2/1992 | Tashiro | 399/374 |
| 5,121,912 | A | * | 6/1992 | Tashiro | 271/3.05 |
| 5,257,064 | A | * | 10/1993 | Okamoto | 355/24 |
| 2006/0291012 | A1 | * | 12/2006 | Katayama et al. | 358/498 |

FOREIGN PATENT DOCUMENTS

| JP | 03-086852 | 11/1992 |
| JP | 05-229531 | 4/1995 |
| JP | 2005089151 A | * 4/2005 |

* cited by examiner

*Primary Examiner*—Cheukfan Lee
(74) *Attorney, Agent, or Firm*—Squire, Sanders & Dempsey L.L.P.

(57) ABSTRACT

An image reading apparatus for reading a document image includes: a document feeding tray for placing the document thereon; a first document reading position for reading the first face of the document ejected and conveyed each from the document feeding tray; a document reverse tray for storing the document so that the document having passed through the first document reading position is reversed and conveyed; a stationary document reading position wherein the document having passed through the document reverse tray and having been reversed and conveyed is conveyed to a platen and the stationary document is read; and an image reading unit for reading the document image. The image reading unit stops at the first document reading position to read the first face of the document, and performs scanning movement at the stationary document reading position to read the second face of the document.

9 Claims, 6 Drawing Sheets

IMAGE FORMING APPARATUS AND READING METHOD OF TWO-SIDED DOCUMENT

BACKGROUND OF THE INVENTION

The present invention relates to an image forming apparatus such as a copying machine and printer, particularly to an image forming apparatus provided with a document reading section permitting automatic reading of a two-sided document, and a method for reading a two-sided document.

In an automatic document reading apparatus, when an image formed on a document is read by the document reading section provided on the image forming apparatus such as a copying machine, a plurality of documents are placed on the document feeding tray. For image formation, each document is automatically picked up and is conveyed to the document reading position. Then the documents having been read are ejected sequentially.

According to the conventional art, when reading the document having a two-sided image, the document on the first face is read at one fixed reading position, and the document is then reversed by the reversing path. After that, the document on the second face is read.

A two-sided document can be read in the following two ways: (a) the first face and second face of a document are read continuously; and (b) the first face of the $N^{th}$ sheet and the second face of the $(N-1)^{th}$ sheet are read alternately using one reversing path.

When the method (a) is used, the first and second faces of the document are read alternately. This will result in a great loss of time in the reversing section. Reading of the first face is carried out for every other page. This requires much time to perform image formation of the copying machine in the final phase. When the method (b) is used, the first face of the $N^{th}$ sheet and the second face of the $(N-1)^{th}$ sheet are read alternately, and efficient circulation of the documents is ensured. However, to avoid collision between the trailing edge of the previous page and the leading edge of the following page at the reversing section, the document conveyance intervals must be lengthened, and the document reading time cannot be reduced.

The Patent Document 1 describes a technique wherein a platen is provided as one fixed document reading section and the two-sided document is read according to the aforementioned method (b).

The Patent Document 2 discloses the method (a) wherein a plurality of documents are sequentially fed to one fixed reading position. After the document of the first face has been read, the document is reversed through switching back, and the second face document is then read. A reversing path is provided separately from the normal conveyance path, and the confluence between the reversing path and normal path is located upstream of the reading position, with the result that the method (b) can also be utilized.

[Patent Document 1] Official Gazette of Japanese Patent No. 3122156

[Patent Document 2] Official Gazette of Japanese Patent No. 2758811

SUMMARY OF THE INVENTION

The feature of the present invention is to solve the problems of the two-sided document reading method according to the aforementioned methods (a) and (b), and to provide an image forming apparatus provided with a document reading section capable of reducing the reading time at the time of reading the two-sided document and a two-sided document reading method.

A first aspect of the present invention may have a structure: An image reading apparatus for reading an image of a document containing: a document feeding tray on which the document is placed; a first document reading position at which a first face image of the document conveyed sheet by sheet from the document feeding tray, is read while the document is conveying; a document reverse tray on which the document having passed through the first document reading position is placed so that the document is reversed and conveyed; a stationary document reading position at which the document having passed through the document reverse tray and having been reversed is conveyed to a platen, and then the stationary document is read; and an image reading unit which reads the image of the document, wherein the image reading unit stops at the first document reading position to read the first face image of the document, and scans at the stationary document reading position to read a second face image of the document.

A second aspect of the present invention may have a structure: a document reading method containing the steps of: reading a first face image of each of N sheets of two-sided documents by a document reading unit at a first document reading position; reversing the document having passed through the first document reading position by a reverse and conveyance path having a conveyance path length corresponding to two or more documents; and reading a second face image of the document having passed through the reverse and conveyance path at the second document reading position by the document reading unit; at the time of continuous reading of two-sided document, reading first face images of first and second sheets at the first document reading position; thereafter, reading a second face image of the first sheet at the second document reading position; and then, alternately reading a first face image of an $n^{th}$ sheet wherein n is 3 or more at the first document reading position and a second face image of an $(n-1)^{th}$ sheet at the second document reading position.

A third aspect of the present invention may have a structure: An image reading apparatus for reading an image of a document containing: a document feeding tray on which the document is placed; a first document reading position at which a first face image of the document conveyed sheet by sheet from the document feeding tray, is read; a document reverse tray on which the document having passed through the first document reading position is temporarily placed so that the document is reversed; a second document reading position in which a second face image of the document having passed through the document reverse tray and having been reversed, is read; and an image reading unit which reads the image of the document, a moving member which moves the image reading unit to conform to each of the reading positions, when the document is read at the first document reading position or the second document reading position.

DETAILED DESCRIPTION OF THE PREFERRED EMBODIMENT

The following describes the embodiments of the present invention. It is to be expressly understood, however, that the engineering scope of the claims or the definition of the terminology of the present invention are not restricted thereto.

Figure 1:
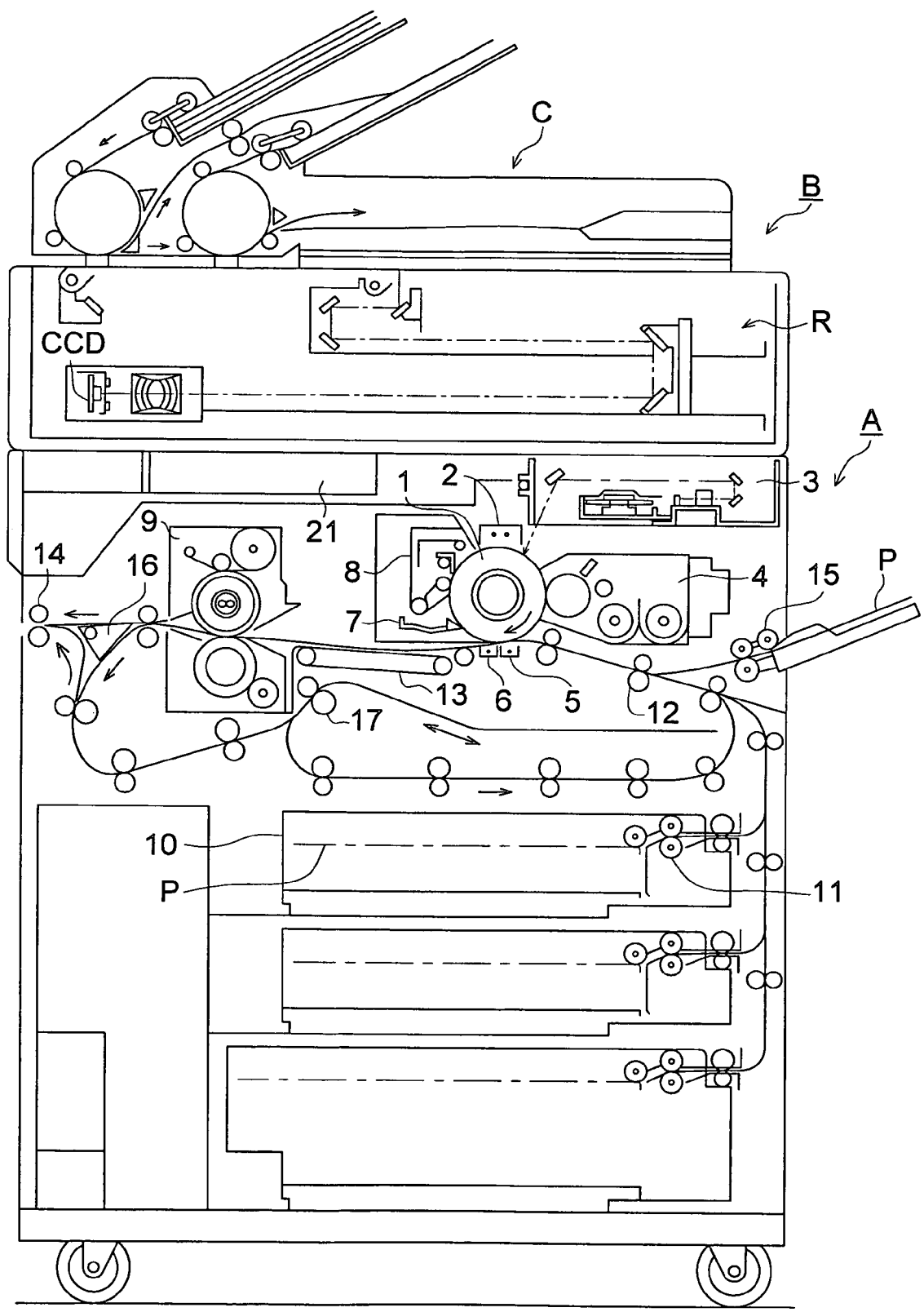
FIG. 1 is a schematic diagram representing an image forming apparatus.

(1) FIG. 1 is a schematic diagram representing an image forming apparatus constituted by an image forming apparatus proper A and a document reading section B.

The image forming apparatus proper A shown in the drawing is constituted by an image forming section containing an image carrier (photoreceptor drum) 1, charger 2, imagewise exposure unit (image writing unit) 3, developing unit 4, transfer unit 5, discharging unit 6, separation claw 7, cleaning unit 8 and others; a fixing unit 9; and a sheet conveyance system.

A sheet conveyance system is constituted by a first conveyance section containing a sheet feed cassette 10, first sheet feeding unit 11, the second sheet feed unit 12, sheet conveyance unit 13, sheet ejecting unit 14 and manual sheet feeding unit 15; and a circulating re-feeding section for re-feeding the sheet P.

The sheet feed cassette 10 and the first sheet feeding unit 11 are formed of a plurality of sheet feed units (three stairs in the figure), store and feed the sheets P of multiple sizes. The sheet size is inputted through the manual setting by the operation section 21 or automatic sheet size setting by sheet size detector.

The image data of the document having been by the document reading section B which will be described later is read by the image sensor CCD (Charge coupled Device). The analog signal having been subjected to photoelectric conversion by the image sensor CCD is subjected to analog processing, analog-to-digital conversion, shading correction and image compression by the image processing section, and the image signal is then sent to the imagewise exposure unit 3.

In the imagewise exposure unit 3, the light emitted from the semiconducting laser is applied to the image carrier 1 of the image forming section, and a latent image is formed. The image forming section provides such processing as charging, exposure, development, transfer, separation and cleaning. The transfer unit 5 allows the image to be transferred to the sheet P fed from the paper feed cassette 10 and manual sheet feeding unit 15. The sheet P carrying the image is fixed by the fixing unit 9, and is ejected from the sheet ejection unit 14.

Alternatively, the sheet P, subjected to one-sided image processing, fed from the conveyance path switching member 16 to the circulating re-feeding section is reversed by the reverse and conveyance rollers 17. After that, two-sided image processing is again applied to the sheet P in the image formation section. Then the fixing unit 9 provides the process of fixing, and the sheet is ejected by the sheet ejecting unit 14.

Figure 2:
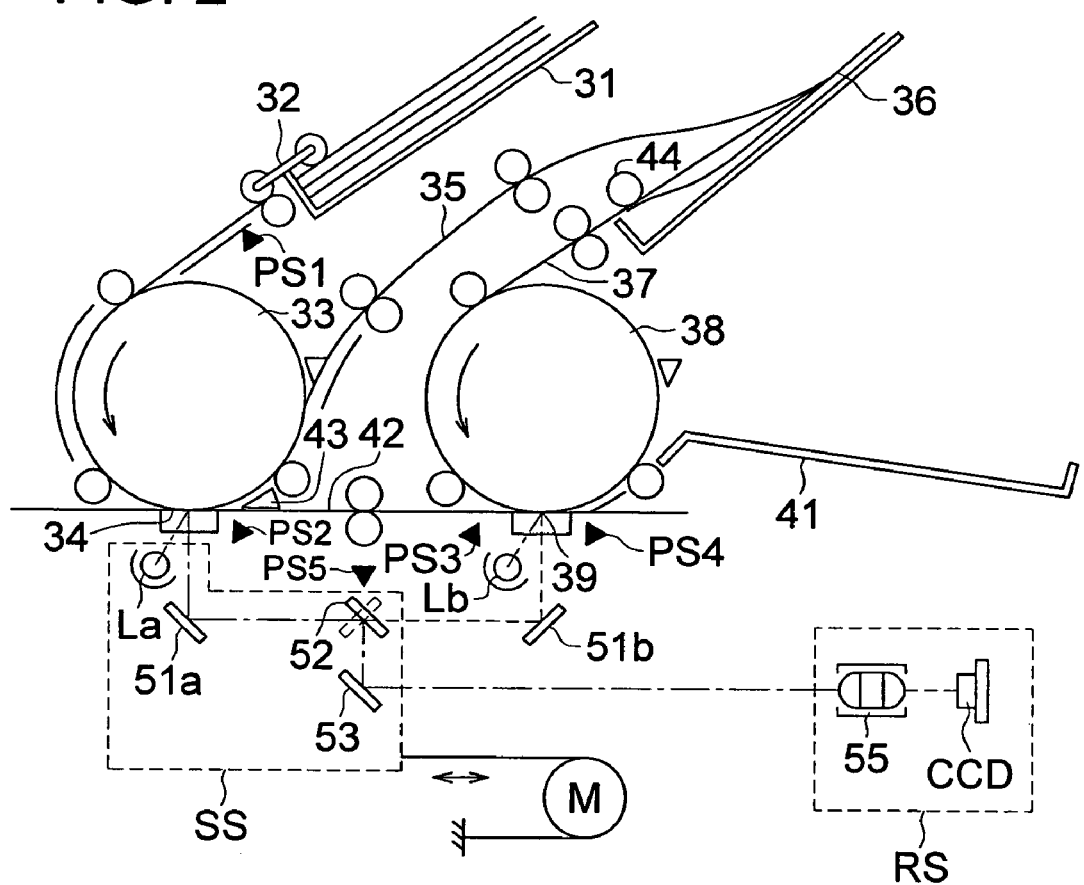
FIG. 2 is a block diagram representing a document reading section as an embodiment of the first embodiment.

(2) FIG. 2 shows the document reading section B as the first embodiment. The document reading section B is constituted by automatic document conveyance section C and image reading unit R.

In the automatic document conveyance section C, reference numeral 31 denotes a document feeding tray where documents are placed, and 32 indicates a conveyance and ejection roller for separating the documents into each sheet and conveying it from the document feeding tray. Reference numeral 33 denotes a first conveyance drum, which rotates in the arrow-marked direction to convey the documents.

The reference numeral 34 indicates the first document reading position in contact with the transparent glass wherein the image is read from below. Numeral 35 denotes the first reverse and conveyance path. The document having been conveyed through the first reverse and conveyance path 35 is once stored in the document reverse tray 36. The documents stored in the document reverse tray are immediately ejected and are conveyed through the second reverse and conveyance path 37. Numeral 38 denotes the second conveyance drum, which rotates in the arrow-marked direction and conveys the documents having been reversed.

The reference numeral 39 indicates the second document reading position in contact with the transparent glass wherein the image is read from below. Numeral 41 shows the document ejection tray. The documents passing through the second document reading position 39 are conveyed by the second conveyance drum 38 and are ejected onto the document ejection tray 41.

The following describes the image reading unit R. The reading unit R reads the image information of the document passing through the first document reading position 34, or the image information of the document passing through the second document reading position 39. In this embodiment, either of the aforementioned two types of image information is read by switching the optical path.

Here, the image reading unit R includes: a reading system RS containing an image forming lens 55, CCD and others; and a scanning system SS containing at least a lamp La, first mirror 51a and direction switching mirror 52. For reading at the first reading position or the second reading position, at least a part of the scanning system SS, i.e. the direction switching mirror 52 is rotated at two positions by moving member M corresponding to the first or second reading position shown as FIG. 2.

The image information of the document passing through the first document reading position 34 which is illuminated by the lamp La, passes through the optical path reflected by the first mirror 51a, direction switching mirror 52 and second mirror 53, and an image is formed on the CCD by the image forming lens 55, thus reading of the image information is carried out.

The image information of the document passing through the second document reading position 39 illuminated by the lamp Lb passes through the optical path reflected by the first mirror 51b, the direction switching mirror 52 having rotated 90 degrees from the previous angular position, and second mirror 53. Then an image is formed on the CCD by the image forming lens 55, thus reading of image information is carried out.

Incidentally, to read the document at the second document reading position 39, there is exemplified the structure, as explained above, in which the lamp Lb is provided and an optical path is arranged to lead the light reflected by the first mirror 51b to the direction switching mirror 52. It is also possible to arrange such a configuration that the scanning system SS moves. For example, it is also possible to arrange such a configuration that at least the lamp La, the first mirror 51a, direction switching mirror 52 and second mirror 53 are integrated into one unit as the unit SS, and the integrated unit is moved by the moving member M to the first or second reading position to ensure that reading can be performed at the first reading position 34 and the second reading position 39.

The document conveyance path of the automatic document conveyance section is provided with a sensor. Based on the information obtained by the sensor, document conveyance and reading by the image reading unit are controlled.

The PS1 denotes a first leading edge sensor. When the first leading edge sensor PS1 has detected the leading edge of the document, the leading edge of the document reaches the first document reading position 34 after a predetermined time elapses. The PS2 indicates a first trailing edge sensor, and detects that the leading edge of the document has passed through the first document reading position 34. The PS3 denotes a second leading edge sensor. It detects that the leading edge of the document has passed through the second document reading position 39. The PS4 is a second trailing edge sensor. It detects that the trailing edge of the document has passed through the second document reading position 39.

The image reading unit is also provided with a sensor. The PS5 indicates a reading switching sensor. It checks whether the image reading unit is in the document reading mode at the first document reading position 34 or at the second document reading position 39. It also checks whether the system is in the middle of switching the reading operation or not.

(3) The following describes how the two-sided documents are read.

When the image is read, the two-sided documents placed on the document feeding tray 31 are separated and are conveyed sheet by sheet by the conveyance ejection roller 32. Each document is conveyed by the rotation of the first conveyance drum 33, and the leading edge of the document reaches the first document reading position 34.

When the sensor PS1 has detected that the leading edge of the document has reached the first document reading position 34, the image reading unit starts reading. Image information of the first face of the moving document is read by the CCD.

When the sensor PS2 has detected that the leading edge of the document has passing through the first document reading position 34, the image reading unit terminates the image reading of the first face. The direction switching mirror 52 turns 90 degrees so that reading at the second document reading position 39 can be performed.

The document having passed through the first document reading position 34 travels along the first reverse and conveyance path 35, and is ejected onto the document reverse tray 36. At the same time, it is switched back. The document passes through the second conveyance path 37, and reaches the second document reading position 39 by the rotating second conveyance drum 38.

The first reverse and conveyance path 35 and the second conveyance path 37 are designed to convey the document into the document reverse tray 36 and eject the document therefrom independently.

When the sensor PS3 has detected that the leading edge of the document having been reversed has reached the second document reading position 39, the image reading unit starts to read the image information of the second face of the document moved by the CCD.

When the sensor PS4 has detected that the leading edge of the document has reached the second document reading position 39, the image reading unit discontinues image reading operation of the second face. The document having passed through the second document reading position 39 is ejected into the document ejection tray 41.

The following describes how to read the two-sided document in the continuous mode.

Figure 3:
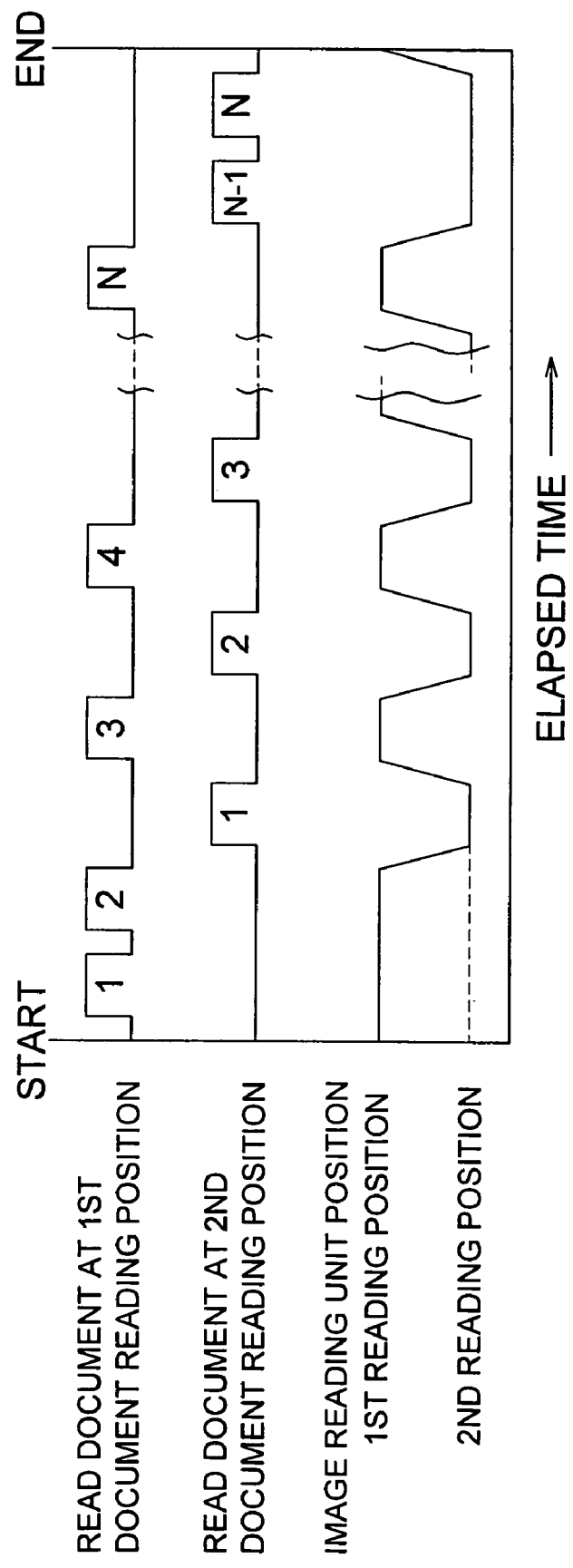
FIG. 3 is a chart showing the order of reading with the lapse of time.

Two-sided documents can be read in the order of the first face of the first sheet, the second face of the first sheet, the first face of the second sheet, the second face of the second sheet, the first face of the third sheet, the second face of the third sheet, etc. However, the aforementioned reverse and conveyance path ensures that the documents are conveyed without passing each other, and a reverse and conveyance path is provided with a conveyance path corresponding to two or more documents. In the document reading section containing a document reading section provided with such a conveyance path, N sheets of two-sided documents are read continuously, as shown in the chart showing the order of reading with the lapse of time given in FIG. 3. Namely, at the first document reading position, the first faces of the first and second sheets are read at first. After that, the second face of the first sheet is read at the second document reading position. Then, reading of the first face of the $n^{th}$ sheet (where n is three or more) at the first document reading position and reading of the second face of the $(n-1)^{th}$ sheet at the second document reading position are carried out alternately. After the first face of the $N^{th}$ sheet (where N is equal to or greater than n) has been read at the first document reading position, the second faces of the $(N-1)^{th}$ sheet and $N^{th}$ sheet are read at the second document reading position. Reading control is provided to ensure that this procedure can be implemented. This arrangement provides a sharp reduction in reading time.

(4) The following describes how to read the one-sided document:

When the image is read, the one-sided documents placed on the document feeding tray 31 are separated and are conveyed sheet by sheet by the conveyance ejection roller 32. Each document is conveyed by the rotation of the first conveyance drum 33, and the leading edge of the document reaches the first document reading position 34.

When the sensor PS1 has detected that the leading edge of the document has reached the first document reading position 34, the image reading unit starts reading. Image information of the moving one-sided document is read by the CCD.

When the sensor PS2 has detected that the leading edge of the document has reached the first document reading position 34, the image reading unit suspends reading of the one-sided document image.

The document having passed through the first document reading position 34 passes through the third conveyance path 42 switched by the conveyance path switching unit 43, and is conveyed by the rotating second conveyance drum 38 without passing through the reverse and conveyance path. The document then pass through the second document reading position 39 without allowing an image to be read, and is ejected onto the document ejection tray 41.

In the present embodiment, in the one-sided document reading mode, the document reverse tray 36 functions as the second document feeding tray. When an image is to be read with N sheets of documents A placed on the document feeding tray 31 and N' sheets of documents B on the document reverse tray 36, the N sheets of documents A are first read. Upon completion of this reading, the N' sheets of documents B are read.

To be more specific, the one-sided images of the documents placed on the document feeding tray 31 are read at the first document reading position 34, as described above. The documents A are continuously conveyed at an adequate spacing. When the sensor PS2 has detected that the leading edge of the $N^{th}$ document has passed through the first document reading position 34, the image reading unit suspends image reading. The direction switching mirror 52 rotates 90 degrees to enable reading at the second document reading position 39.

When the sensor PS4 has detected that the $N^{th}$ document A has passed through the second document reading position 39, the conveyance ejection roller 44 starts to eject the documents B on the document reverse tray 36 sheet by sheet. Passing through the second reverse and conveyance path 37, the document is conveyed to the second document reading position 39 by the rotating second conveyance drum 38.

When the sensor PS3 has detected that the leading edge of the document has reached the second document reading position 39, the image reading unit starts to read. The image information of the moving document B is read by the CCD.

When the sensor PS4 has detected that the leading edge of the document has passed through the second document reading position 39, the image reading unit suspends reading of the one-sided document image. The document having passed through the second document reading position 39 is ejected onto the document ejection tray 41. The images of the N' sheets of documents B are read continuously at short intervals. This procedure saves power and ensures high-speed reading.

According to the first embodiment, when two-sided documents are read, documents before and after being reversed are made to pass through the document reverse tray. This ensures stable document conveyance without documents colliding with each other at the time of passing by. This arrangement reduces the document conveyance time, hence the reading time.

In addition to the advantages when reading the two-sided document, the first embodiment allows documents to be conveyed at the minimum intervals when reading the one-sided document. This arrangement reduces the reading time.

Further, in the first embodiment, when the one-sided document is read, the document reverse tray functions as the second document feeding tray. Upon completion of the reading of the documents placed on the first document feeding tray, the documents placed on the document reverse tray starts to be read. This arrangement saves power and ensures highly efficient reading.

Figure 4:
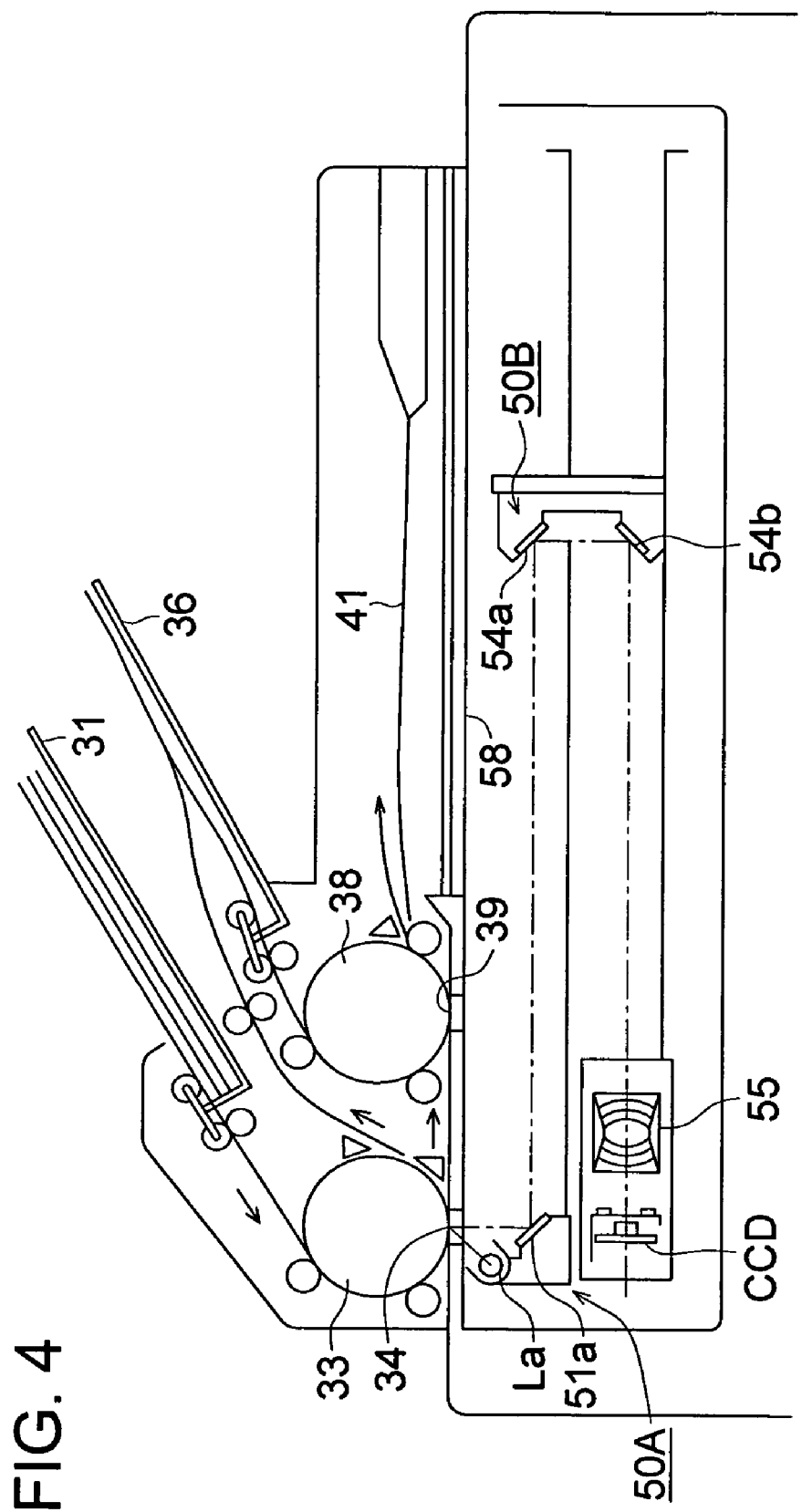
FIG. 4 is a block diagram representing a document reading section as an embodiment of the second embodiment.
Figure 5:
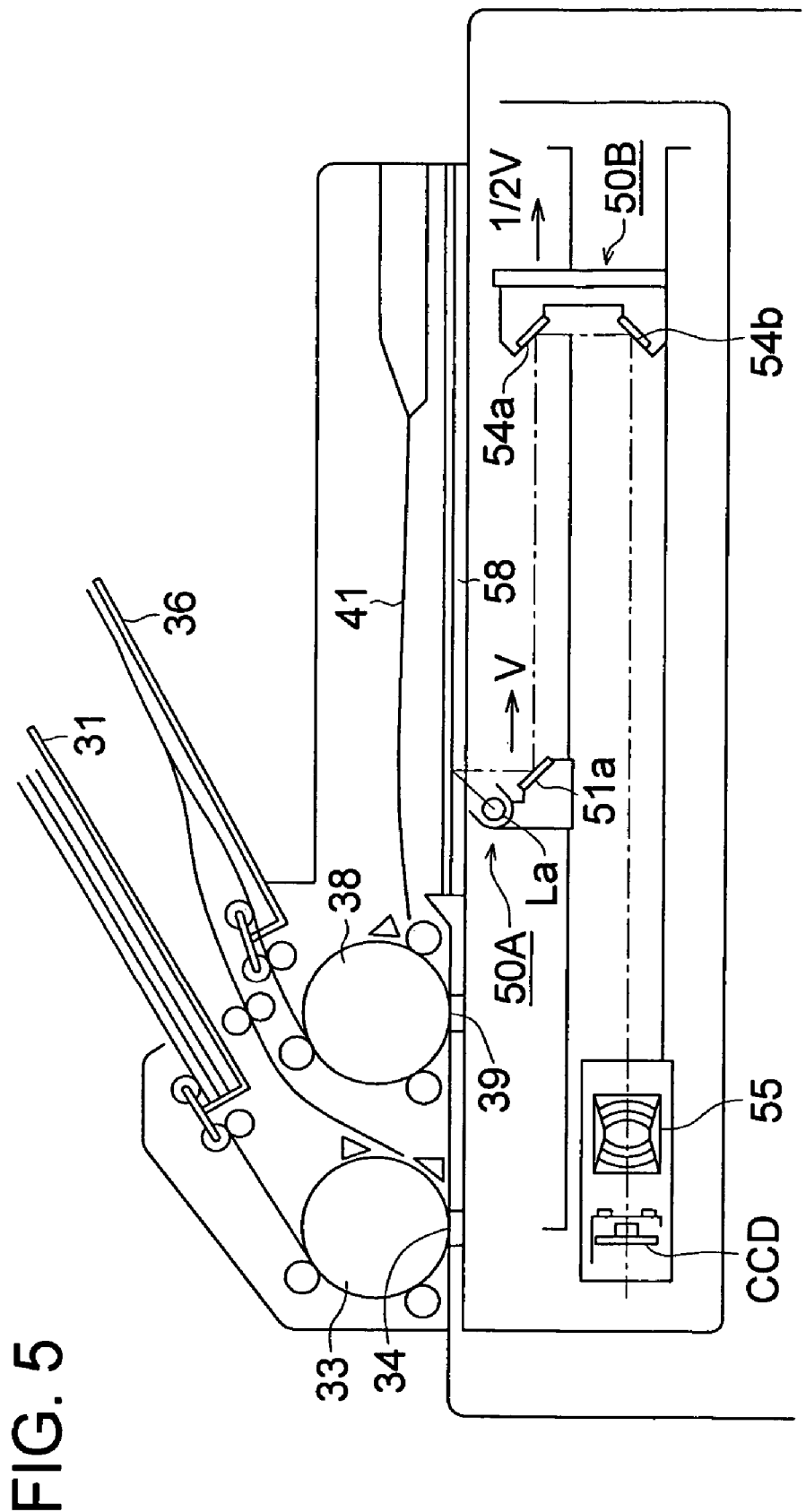
FIG. 5 is also a block diagram representing a document reading section as an embodiment of the second embodiment.

(5) In addition to the automatic document conveyance section described with reference to FIG. 2, the second embodiment given in FIGS. 4 and 5 is provided with a platen that allows documents to be placed thereon sheet by sheet for image reading. To read the document on the platen, the image reading unit performs scanning operation. The members having the same functions as those already described with reference to FIG. 2 are assigned with the same reference numerals and will not be described to avoid duplication.

FIG. 4 shows the image reading of the document passing through the first document reading position 34. FIG. 5 shows that the document placed on the platen 58 provided with a transparent platen glass is scanned for image reading by the image reading unit.

The image reading unit is provided with a first mirror unit 50A and a second mirror unit 50B. The first mirror unit 50A is equipped with a lamp La for illuminating the second document reading position 39 and a first mirror 51a. When the document on the platen 58 is read, the first mirror unit 50A moves in the arrow-marked direction, as shown in FIG. 5. The second mirror unit 50B is provided with a second mirror 54a and a third mirror 54b. At the time of reading, these mirrors move in the arrow-marked direction at the speed ½(V). Scanning is performed with the optical path maintained at a predetermined length, whereby image is read by the CCD.

At the time of continuous image reading of the one-sided or two-sided document, both the first mirror unit 50A and second mirror unit 50B are fixed at predetermined positions, and the process of image reading is applied to the moving documents, as described above.

In addition to the first and second document reading positions, the second embodiment is provided with a platen as a third reading position. This arrangement reduces the reading time and allows continuous reading of the one-sided and two-sided document to be performed. At the same time, since the documents are placed on the platen, sheet by sheet reading of the bound documents and others is enabled. Moreover, this arrangement allows one and the same image reading unit to perform effective reading of all documents.

According to the second embodiment, furthermore, at the time of continuous reading of the two-sided documents, reading is performed by maintaining a predetermined relationship between the order in which the documents are sent to the first document reading position and the order in which they are sent to the second document reading position. This minimizes the idling time in document conveyance, and hence minimizes the document reading time.

Figure 6:
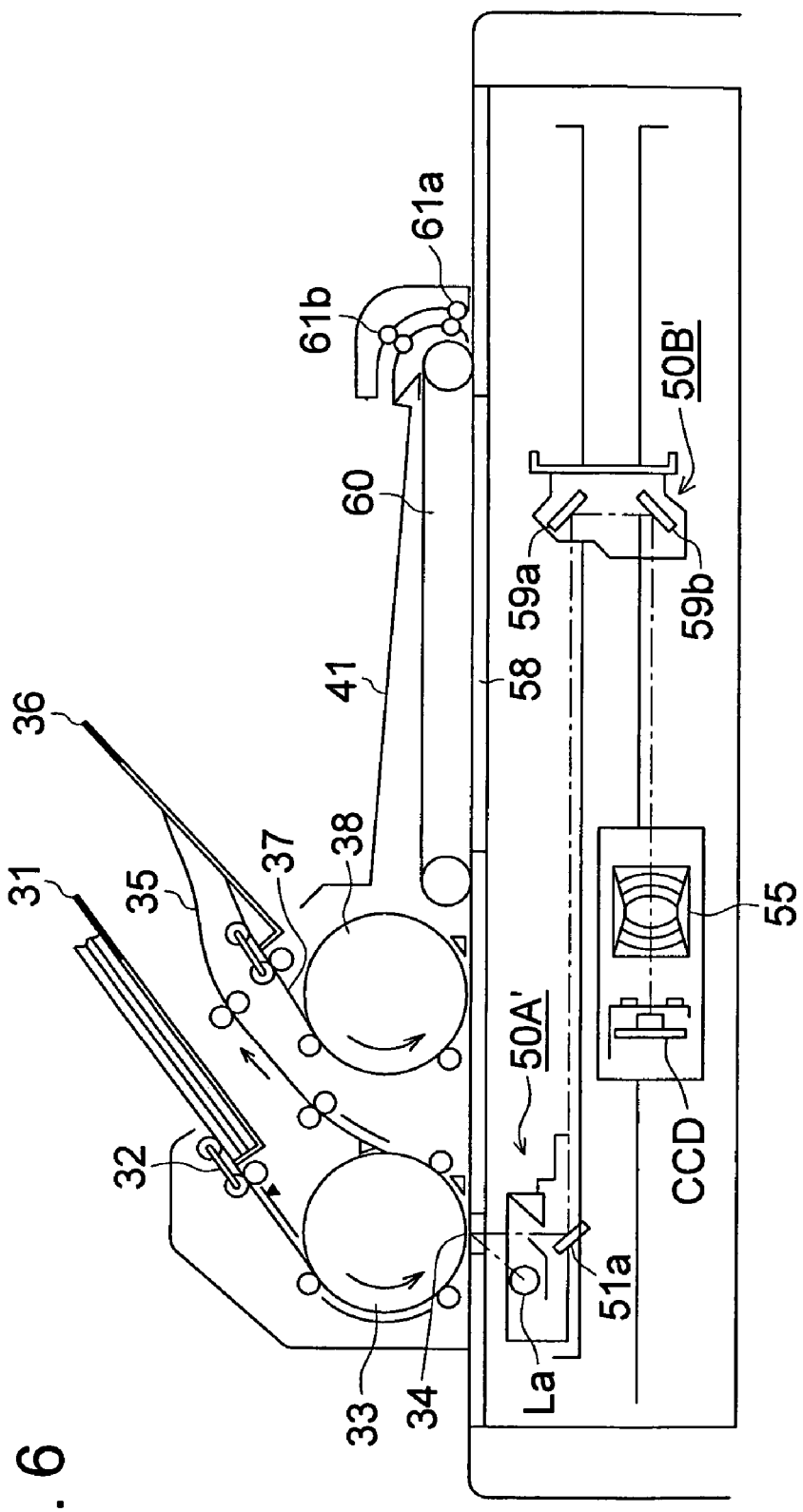
FIG. 6 is a block diagram representing a document reading section as another embodiment of the second embodiment.

The following describes another embodiment with reference to FIG. 6.

The difference between the document reading apparatus of the present embodiment from that given in FIG. 2 is that a platen 58 is provided instead of a second document reading position 39. At the time of two-sided document reading, image reading of the second face is performed with the documents stationary on the platen 58.

At the time of continuous reading of the two-sided documents, the documents placed on the document feeding tray 31 are separated and conveyed sheet by sheet. Each document is conveyed to the reverse and conveyance path through the first document reading position 34 by the rotating first conveyance drum 33. While the document is passing through the first document reading position 34, image reading of the first face document is performed by the image reading unit.

The documents are conveyed through the first reverse and conveyance path 35 and are switched back at the document reverse tray 36. After passing through the second reverse and conveyance path 37, the document is reversed by the rotating second conveyance drum 38 and the rotating conveyance belt 60, and is stopped at a predetermined position on the platen 58.

The image reading unit having finished image reading of the first face at the first document reading position 34 performs reading by scanning the second face of the document by the movement of the first mirror unit 50A' formed of a lamp La and a first mirror 51 at the speed (V) and of the second mirror unit 50B' provided with the mirrors 59a and 59b at the speed ½ (V) in the same direction. The document having been read by scanning is ejected onto the document ejection tray 41 by a conveyance belt 60 and a paired conveyance rollers 61a and 61b following the same. The image reading unit having completed scanning operation goes back to the image reading position of the illustrated first document reading position 34. This is followed by the next step of image reading.

At the time of continuous one-sided document reading, the documents placed on the document feeding tray 31 are conveyed sheet by sheet, and each document is fed through the first document reading position 34 by the rotating first conveyance drum 33. The one-sided image of the document passing by is read by the image reading unit.

The document having passed through the first document reading position 34 passes through the third conveyance path 42, and is conveyed by the rotating second conveyance drum 38 and conveyance belt 60 to be ejected onto the document ejection tray 41. Such a reading operation is performed on a continuous basis without interruption.

According to another embodiment, the documents having been reversed during the reading operation of the first faces at the first document reading position are moved onto the platen as a second document reading position. The documents at the stopped position are read by scanning, without having to wait for the document reading unit. This arrangement ensures a highly efficient reading operation.

According to a further embodiment, at the time of continuous two-sided document reading, at the time of continuous reading of the two-sided documents, reading is performed by maintaining a predetermined relationship between the order in which the documents are sent to the first document reading position and the order in which they are sent to the second document reading position. This arrangement provides a two-sided document reading method capable of minimizing the idling time in document conveyance, and hence minimizing the document reading time.

What is claimed is:

1. An image reading apparatus for reading an image of a document, comprising:
    (a) a document feeding tray on which the document is placed;
    (b) a first document reading position at which a first face image of the document conveyed sheet by sheet from the document feeding tray, is read;
    (c) a document reverse tray on which the document having passed through the first document reading position is temporarily placed so that the document is reversed;
    (d) a second document reading position in which a second face image of the document having passed through the document reverse tray and having been reversed, is read;
    (e) an image reading unit which reads the image of the document; and
    (f) a moving member which moves the image reading unit to conform to each of the reading positions, when the document is read at the first document reading position or the second document reading position,
    wherein when reading of a one-sided document is carried out, the document reverse tray functions as a second document feeding tray, a first face image of a document that is ejected from the document reverse tray, is read at the second document reading position.

2. The image reading apparatus of claim 1, further comprising:
    a document ejection tray on which the document having passed through the second document reading position is stacked;
    a first reverse and conveyance path through which the document having passed through the first document reading position is conveyed to the document reverse tray; and
    a second reverse and conveyance path through which the document from the document reverse tray is conveyed to the second document reading position,
    wherein when reading of a one-sided document is carried out, the document, the first face image of which has been read at the first document reading position, is ejected onto the document ejection tray through a conveyance path that is branched from the first reverse and conveyance path without allowing the second face image of the document to be read at the second reading position.

3. The image reading apparatus of claim 1, further comprising a platen on which documents are placed and read sheet by sheet, and the image reading unit reads the document on the platen while scanning a face of the document.

4. An image reading apparatus for reading an image of a document, comprising:
    (a) a document feeding tray on which the document is placed;
    (b) a first document reading position at which a first face image of the document conveyed sheet by sheet from the document feeding tray, is read;
    (c) a document reverse tray on which the document having passed through the first document reading position is temporarily placed so that the document is reversed;
    (d) a second document reading position in which a second face image of the document having passed through the document reverse tray and having been reversed, is read;
    (e) an image reading unit which reads the image of the document; and
    (f) a moving member which moves the image reading unit to conform to each of the reading positions, when the document is read at the first document reading position or the second document reading position,
    further comprising a direction switching mirror, wherein a direction of the mirror is changed by the moving member.

5. The image reading apparatus of claim 4, further comprising:
    a document ejection tray on which the document having passed through the second document reading position is stacked;
    a first reverse and conveyance path through which the document having passed through the first document reading position is conveyed to the document reverse tray; and
    a second reverse and conveyance path through which the document from the document reverse tray is conveyed to the second document reading position,
    wherein when reading of a one-sided document is carried out, the document, the first face image of which has been read at the first document reading position, is ejected onto the document ejection tray through a conveyance path that is branched from the first reverse and conveyance path without allowing the second face image of the document to be read at the second reading position.

6. The image reading apparatus of claim 4, further comprising a platen on which documents are placed and read sheet by sheet, and the image reading unit reads the document on the platen while scanning a face of the document.

7. An image reading apparatus for reading an image of a document, comprising:
    (a) a document feeding tray on which the document is placed;
    (b) a first document reading position at which a first face image of the document conveyed sheet by sheet from the document feeding tray, is read;
    (c) a document reverse tray on which the document having passed through the first document reading position is temporarily placed so that the document is reversed;
    (d) a second document reading position in which a second face image of the document having passed through the document reverse tray and having been reversed, is read;
    (e) an image reading unit which reads the image of the document; and
    (f) a moving member which moves the image reading unit to conform to each of the reading positions, when the document is read at the first document reading position or the second document reading position,
    wherein a conveyance path through which the document having passed through the first document reading position is conveyed onto the second document reading position through the document reverse tray, has a length corresponding to two or more documents,
    wherein when N sheets of two-sided documents are continuously read, after first face images of first and second sheets are read at the first document reading position, a second face image of the first sheet is read at the second document reading position, and then, a first face image of an $n^{th}$ sheet where an equation $N>n\geqq3$ is satisfied, at the first document reading position and a second face image of an $(n-1)^{th}$ sheet at the second document reading position, are alternately read, and wherein after a first face image of a final sheet of the N sheets is read at the first document reading position, second face images of $(N-1)^{th}$ and $N^{th}$ sheets are read at the second document reading position.

8. The image reading apparatus of claim 7, further comprising:
   a document ejection tray on which the document having passed through the second document reading position is stacked;
   a first reverse and conveyance path through which the document having passed through the first document reading position is conveyed to the document reverse tray; and
   a second reverse and conveyance path through which the document from the document reverse tray is conveyed to the second document reading position,
   wherein when reading of a one-sided document is carried out, the document, the first face image of which has been read at the first document reading position, is ejected onto the document ejection tray through a conveyance path that is branched from the first reverse and conveyance path without allowing the second face image of the document to be read at the second reading position.

9. The image reading apparatus of claim 7, further comprising a platen on which documents are placed and read sheet by sheet, and the image reading unit reads the document on the platen while scanning a face of the document.

* * * * *

UNITED STATES PATENT AND TRADEMARK OFFICE
CERTIFICATE OF CORRECTION

| | | |
|---|---|---|
| PATENT NO. | : 7,646,516 B2 | Page 1 of 1 |
| APPLICATION NO. | : 11/403066 | |
| DATED | : January 12, 2010 | |
| INVENTOR(S) | : Katayama et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 936 days.

Signed and Sealed this

Sixteenth Day of November, 2010

David J. Kappos
*Director of the United States Patent and Trademark Office*